(12) United States Patent
Onggosanusi et al.

(10) Patent No.: US 8,942,164 B2
(45) Date of Patent: Jan. 27, 2015

(54) DIFFERENTIAL CQI FOR OFDMA SYSTEMS

(75) Inventors: Eko N. Onggosanusi, Allen, TX (US); Runhua Chen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1374 days.

(21) Appl. No.: 12/254,738

(22) Filed: Oct. 20, 2008

(65) Prior Publication Data

US 2009/0109909 A1 Apr. 30, 2009

Related U.S. Application Data

(60) Provisional application No. 60/981,718, filed on Oct. 22, 2007, provisional application No. 60/987,619, filed on Nov. 13, 2007, provisional application No. 61/021,264, filed on Jan. 15, 2008.

(51) Int. Cl.
*H04W 4/00* (2009.01)
*H04B 7/06* (2006.01)
*H04L 5/00* (2006.01)

(52) U.S. Cl.
CPC ............ *H04B 7/0617* (2013.01); *H04L 5/0091* (2013.01); *H04L 5/0023* (2013.01)
USPC ........................................................ 370/328

(58) Field of Classification Search
USPC ................................................. 370/310, 328
See application file for complete search history.

(56) References Cited

U.S. PATENT DOCUMENTS

| 2004/0141466 | A1 | 7/2004 | Kim et al. |
| 2005/0201295 | A1 | 9/2005 | Kim et al. |
| 2006/0287743 | A1 * | 12/2006 | Sampath et al. ................ 700/90 |
| 2007/0026808 | A1 | 2/2007 | Love |
| 2008/0219219 | A1 * | 9/2008 | Sartori et al. ................. 370/335 |
| 2009/0154588 | A1 * | 6/2009 | Chen et al. .................... 375/267 |

FOREIGN PATENT DOCUMENTS

WO 2007112371 A1 4/2007

* cited by examiner

*Primary Examiner* — Hassan Kizou
*Assistant Examiner* — Ashil Farahmand
(74) *Attorney, Agent, or Firm* — Ronald O. Neerinos; Frederick J. Telecky, Jr.

(57) ABSTRACT

Embodiments of the present disclosure provide a feedback generator, a feedback decoder and methods of operating a feedback generator and decoder. In one embodiment, the feedback generator is for use in user equipment and includes a CQI profile module configured to provide a differential channel quality indicator, wherein the differential channel quality indicator represents a difference between indices corresponding to allocatable channel quality indicators. The feedback generator also includes a transmit module that transmits the differential channel quality indicator. In one embodiment, the feedback decoder is for use in a base station and includes a receive module configured to receive a differential channel quality indicator. The feedback decoder also includes a CQI selection module configured to provide allocatable channel quality indicators from the differential channel quality indicator based on a differential index, wherein the differential index represents a difference between indices corresponding to the allocatable channel quality indicators.

28 Claims, 5 Drawing Sheets

DIFFERENTIAL CQI FOR OFDMA SYSTEMS

CROSS-REFERENCE TO RELATED APPLICATIONS

This application claims the benefit of U.S. Provisional Application Ser. No. 60/981,718, filed by Eko N. Onggosanusi and Runhua Chen on Oct. 22, 2007, entitled "Differential CQI for OFDMA Systems", commonly assigned with this application and incorporated herein by reference.

This application also claims the benefit of U.S. Provisional Application Ser. No. 60/987,619, filed by Eko N. Onggosanusi and Runhua Chen on Nov. 13, 2007, entitled "Differential CQI for OFDMA Systems", commonly assigned with this application and incorporated herein by reference.

This application further claims the benefit of U.S. Provisional Application Ser. No. 61/021,264, filed by Runhua Chen and Eko N. Onggosanusi on Jan. 15, 2008, entitled "UE-Selected CQI Feedback for MIMO", commonly assigned with this application and incorporated herein by reference.

TECHNICAL FIELD

The present disclosure is directed, in general, to a communication system and, more specifically, to a feedback generator, a feedback decoder and methods of operating a feedback generator and a feedback decoder.

BACKGROUND

A key principle in orthogonal frequency division multiple access (OFDMA) communication systems is that the total operating bandwidth is divided into non-overlapping sub-bands, also called resource blocks (RBs), where transmissions for user equipment (UE) occur in an orthogonal (i.e., not mutually interfering) manner. Each RB can potentially carry data to a different UE. More typically, each UE having a sufficiently high signal-to-interference and noise ratio (SINR) will use a well-chosen set of RBs, so that the spectral efficiency of the transmission is maximized according to the operating principle of a scheduler. By scheduling each UE on RBs where it has high SINR, the data rate transmitted to each UE, and therefore the overall system throughput, can be optimized according to the scheduling principle. To enable more optimum frequency domain scheduling of UEs in the RBs of the operating bandwidth, each UE feeds back a channel quality indicator (CQI) it might potentially experience for each RB or each combination of RBs to its serving base station (Node B). Improvements in this process of feeding back this information would prove beneficial in the art.

SUMMARY

Embodiments of the present disclosure provide a feedback generator, a feedback decoder and methods of operating a feedback generator and a feedback decoder. In one embodiment, the feedback generator is for use in user equipment and includes a CQI profile module configured to provide a differential channel quality indicator, wherein the differential channel quality indicator represents a difference between indices corresponding to allocatable channel quality indicators. The feedback generator also includes a transmit module that transmits the differential channel quality indicator. In one embodiment, the feedback decoder is for use in a base station and includes a receive module configured to receive a differential channel quality indicator. The feedback decoder also includes a CQI selection module configured to provide allocatable channel quality indicators from the differential channel quality indicator based on a differential index, wherein the differential index represents a difference between indices corresponding to the allocatable channel quality indicators.

In another aspect, the method of operating the feedback generator is for use in user equipment and includes providing a differential channel quality indicator, wherein the differential channel quality indicator represents a difference between indices corresponding to allocatable channel quality indicators. The method of operating the feedback generator also includes transmitting the differential channel quality indicator. In another aspect, the method of operating the feedback decoder is for use in a base station and includes receiving a differential channel quality indicator. The method of operating the feedback decoder also includes providing allocatable channel quality indicators from the differential channel quality indicator based on a differential index, wherein the differential index represents a difference between indices corresponding to the allocatable channel quality indicators.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

For a more complete understanding of the present disclosure, reference is now made to the following descriptions taken in conjunction with the accompanying drawings, in which.

DETAILED DESCRIPTION

It is beneficial to use efficient CQI feedback techniques to reduce the amount of overhead information incurred between a collection of user equipment (UEs) and a serving base station (Node B). This may be done by recognizing that channel quality indicator (CQI) feedback across multiple resource blocks (RBs) is often strongly correlated. Embodiments of the present disclosure exploit this channel property and propose specific approaches to reduce the CQI feedback overhead in uplink (UL) communications (a communication from the UEs to their serving Node B).

Figure 1A:
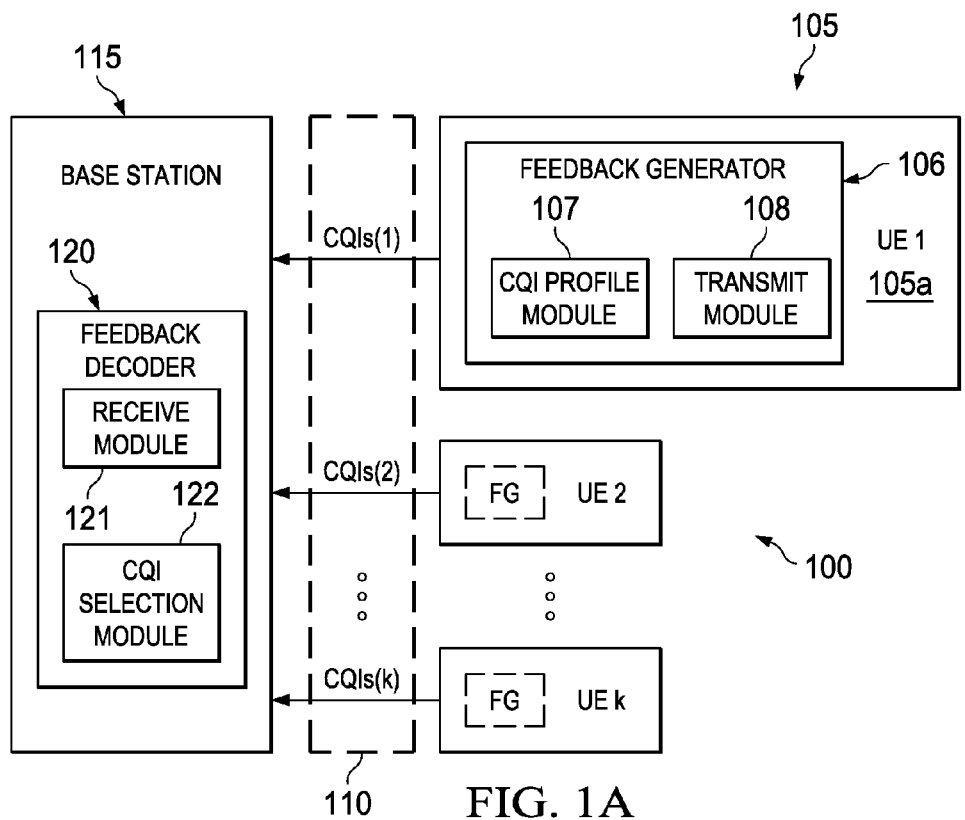
FIGS. 1A and 1B illustrate functional diagrams of an uplink portion and a downlink portion of a communications system as provided by one embodiment of the disclosure.
Figure 1B:
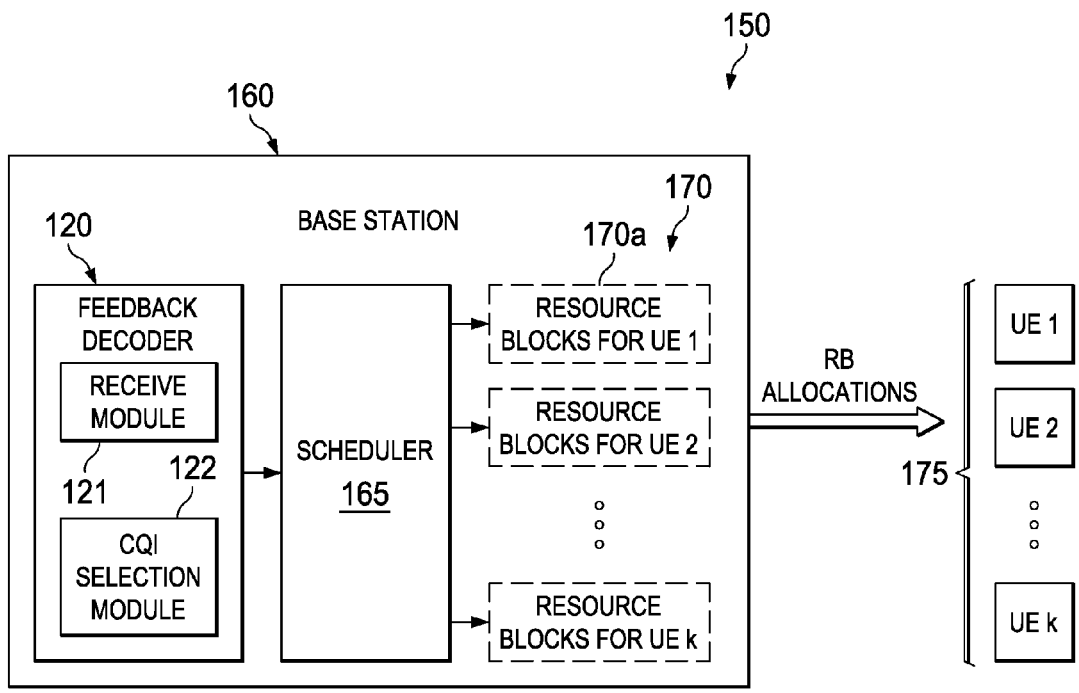

FIGS. 1A and 1B illustrate functional diagrams of an uplink portion 100 and a downlink portion 150 of a communications system as provided by one embodiment of the disclosure. In the illustrated embodiment, the communications system is an orthogonal frequency division multiple access (OFDMA) system, which provides a total operating bandwidth divided into non-overlapping RBs. The RBs provide transmissions for different UEs that occur in an orthogonal or substantially independent manner wherein each RB can potentially carry data to a different UE.

The illustrated uplink portion 100 includes a plurality of UEs 105 wherein a first UE 105a is representative. The uplink portion 100 also includes a plurality of compressed CQIs 110 corresponding to each of the plurality of UEs 105 that is provided over a wireless feedback channel to a serving Node B 115.

In the uplink portion 100, the first UE 105a includes a feedback generator 106 that has a CQI profile module 107 and a transmit module 108. The feedback generator 106 is representative of feedback generators in the remaining plurality of UEs 105. The base station 115 includes a feedback decoder 120 that has a receive module 121 to recover a feedback signal transmitted by the UEs. The feedback decoder 120 also has a CQI selection module 122, which provides a restored CQI (i.e., reverses the CQI compression by the UE) from the feedback signal that may occur on one or more RBs.

FIG. 1B depicts an exemplary downlink transmission system 150. After decoding of the feedback signal and CQI selection, the uncompressed CQI of different UEs is provided to a scheduler 165 in a Node B 160. The scheduler 165 selects the UEs to be transmitted on each RB along with corresponding modulation and coding schemes. Modulation and coding is provided for the different UEs, and a resulting signal is then summed up and transmitted on a downlink channel to a plurality of UEs 175.

The CQI profile module 107 is configured to provide a differential channel quality indicator, wherein the differential channel quality indicator represents a difference between indices corresponding to allocatable channel quality indicators. The transmit module 108 transmits the differential channel quality indicator. The receive module 121 is configured to receive the differential channel quality indicator. The CQI selection module 122 is configured to provide allocatable channel quality indicators from the differential channel quality indicator based on a differential index, wherein the differential index represents a difference between indices corresponding to the allocatable channel quality indicators.

Figure 2:
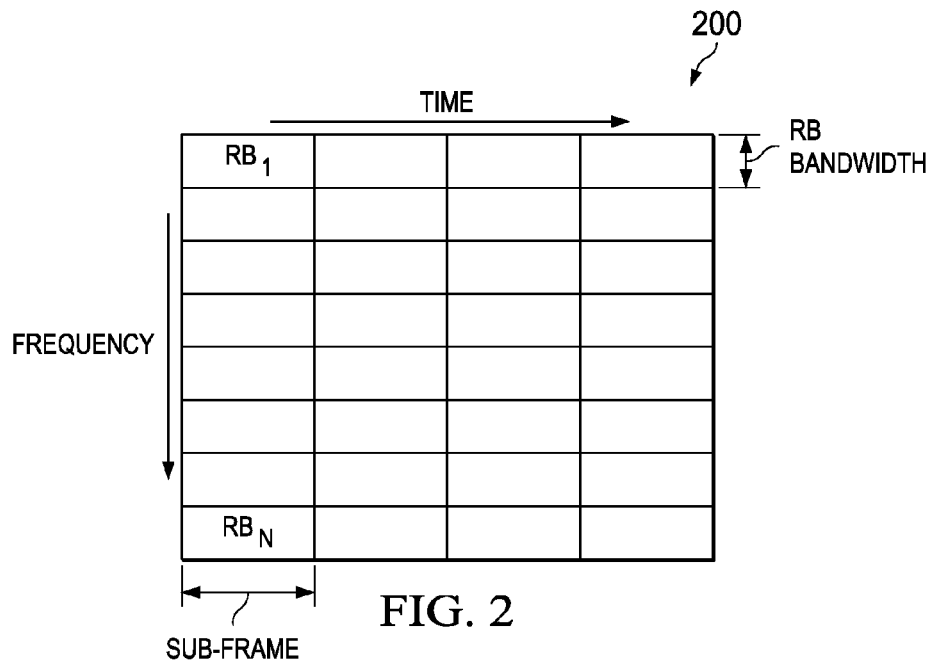
FIG. 2 illustrates a diagram of a frequency-time operating resource space as may be employed by an OFDMA communications system such as shown in FIGS. 1A and 1B.

FIG. 2 illustrates a diagram of a frequency-time operating resource space 200 as may be employed by an OFDMA communications system such as shown in FIGS. 1A and 1B. An operating bandwidth of the operating resource space 200 may be divided into N resource blocks ($RB_1$-$RB_N$) wherein each of the N resource blocks may be defined as a set of adjacent sub-carriers (tones). For example, a 3GPP LTE system with 5 MHz bandwidth employs 25 RBs wherein each has a 180 kHz bandwidth for a total operating bandwidth of 4.5 MHz, with the remaining 0.5 MHz providing a guard band separating transmissions on two adjacent bands on different cells.

A sub-band of the operating bandwidth corresponds to a collection of one or more RBs. One sub-band is defined as the smallest unit for CQI reporting. That is, the RBs may also be concatenated to form larger ones thereby fundamentally reducing the CQI reporting overhead and the control channel overhead in the downlink that signals their allocated RBs to UEs that have been scheduled. Based on the channel, interference and noise variance estimates, the UE computes a CQI for each RB. As previously mentioned, some examples of CQI are SINR, recommended or supportable spectral efficiency, recommended or supportable modulation-and-coding-scheme (MCS), received signal strength and mutual information. Since the CQI is typically quantized or discrete, a set of possible CQI values is predefined along with the respective index of each.

Referring again to FIGS. 1A and 1B, various embodiments of the present disclosure for providing CQI compression in the forms of differential CQIs are presented below. An OFDMA system with system bandwidth divided into N resource blocks (RBs) is considered. A resource block is defined as a set of adjacent sub-carriers (tones). In addition, we define a sub-band as the smallest entity for CQI report where one sub-band consists of n adjacent RBs. Hence, the system bandwidth contains M sub-bands where M is approximately or exactly N/n. For example, a 3GPP E-UTRA system with 10 MHz bandwidth has 50 RBs, each having 180 kHz. For n=2, there are M=25 sub-bands for 3GPP E-UTRA. Based on the channel and interference/noise variance estimates, the UE computes the CQI for each of the M sub-bands. This is defined for each spatial stream or codeword.

In this disclosure, it is assumed that the CQI is defined in terms of a suggested or recommended data rate or spectral efficiency, which may be a suggested transport block size (TBS) or modulation-and-coding scheme (MCS). In this case, CQI quantization is defined in terms of a set of $N_R$ data rates, which can be quantized in $n_R = \log_2 \lceil N_R \rceil$ bits. The set of data rates (spectral efficiency) is denoted as $S_R = \{R_0, R_1, \ldots, R_{N_R-1}\}$.

Since the $N_R$ data rates may not be uniformly spaced, the difference between two CQI values may not be well-defined. This is because the set is chosen to correspond to a uniform spacing in terms of the required SNR/SINR, which typically corresponds to a non-uniform spacing of data rates or spectral efficiencies. Hence, the set of possible differential CQIs is also a function of the reference value. To avoid this problem, the following definitions for CQI are employed.

The reference CQI X is defined in terms of the original set of possible data rates S. Therefore, the reference CQI is defined in terms of the suggested data rate or spectral efficiency. The differential CQI $\Delta Y$ for a given CQI value Y (relative to the reference CQI) is not defined as $\Delta Y = Y - X$ due to the problems mentioned above. Rather, the differential CQI is defined as the difference in the indices of Y and X (where the index refers to the element in S). That is, if $Y = R_i$ and $X = R_k$, then $\Delta Y = i - k$. It is assumed that the elements in $S_R = \{R_0, R_1, \ldots, R_{N_R-1}\}$ are sorted ascendingly, where $R_1 < R_k$ if i<k.

The differential CQI is defined in terms of $N_A$ levels (a set of $N_A$ differential indices $S_A = \{\Delta_0, \Delta_1, \ldots, \Delta_{N_R-1}\}$) and therefore, can be represented in $n_A = \lceil \log_2 N_A \rceil$ bits. For example, if $S_A = \{0, \pm 1, \pm 2, \pm 3\}$ or $S_A = \{0, \pm 2, \pm 4, \pm 6\}$, $n_A = 3$. Alternatively, it is possible to define the set $S_A$ differently depending on the scheme.

For instance, if the reference CQI is always smaller than or equal to the given CQI, $S_A$ only needs to contain non-negative values, as shown in equation (1).

$$S_A = \{0, l, 2l, \ldots, (N_x-1)l\} \text{ or } S_A = \{l, 2l, \ldots, N_A l\}. \quad (1)$$

where l is a non-negative integer. Conversely, if the reference CQI is always larger that or equal to the given CQI, $S_A$ only needs to contain non-positive values, as shown in equation (2).

$$S_A = \{0, -l, 2l, \ldots, -(N_A-1)l\} \text{ or } S_A = \{-l, -2l, \ldots, -N_A l\}. \quad (2)$$

The elements of $S_\Delta$ do not have to be uniformly spaced. That is, any set of differential indices is possible.

Also, the definition of $\Delta Y = Y - X$ may be redefined as $\Delta Y = X - Y$. In this case, the above examples are modified accordingly. The zero difference may or may not be included in the set. An asymmetric set may also be used where more negative or positive elements are used. For example, $S_\Delta = \{-2, -1, 0, +1, +2, +3, +4\}$ or $S_\Delta = \{-4, -3, -2, -1, 0, +1, +2\}$. An asymmetric set may be used when the reference CQI X can be a little larger than Y in some scenarios. Such a scenario may occur, for instance, when best-m average with wideband CQI reference is used. When the resulting $\Delta Y = i - k$ is not contained in the set $S_\Delta$, the set element that is closest to $\Delta Y$ is chosen for the CQI feedback (report). It may be noted that the presented definitions of the differential CQI may also be applied to any CQI definition (e.g. SINR, mutual information, etc.) since the quantized CQI may often be expressed in terms of a finite set of values.

FIGS. 3A, 3B, 3C and 3D illustrate embodiments of different CQI compression schemes 300, 320, 340 and 360 constructed according to the principles of the present disclosure. These specific examples are provided for illustration, and the concepts discussed above may be applied to other CQI compression schemes.

Figure 3A:
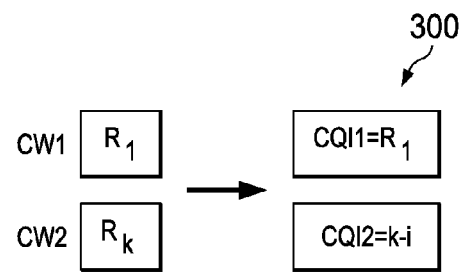
FIGS. 3A, 3B, 3C and 3D illustrate embodiments of different CQI compression schemes constructed according to the principles of the present disclosure.

First, the concepts are applied to spatial (MIMO) CQI compression in 3GPP E-UTRA, where a maximum of two spatial codewords can be supported. In this case, the reference CQI is defined as the CQI corresponding to the first codeword. The CQI for the second codeword is defined in terms of the differential CQI, which is expressed in terms of the differential index. This is illustrated in FIG. 3A.

Since the CQI for the second codeword can be smaller or larger than the CQI for the first codeword (reference CQI), $$S_\Delta = \left\{ 0, \pm l, \pm 2l, \ldots, \pm \left(\frac{N_\Delta}{2} - 1\right)l \right\} \text{ or} \quad (3)$$

$$S_\Delta = \left\{ \pm l, \pm 2l, \ldots, \pm \frac{N_\Delta}{2} l \right\}$$

is appropriate. For example, $N_\Delta = 8$ can be chosen, which results in a 3-bit (spatial) differential CQI. This embodiment is also appropriate to the wideband-only CQI transmission. Here, wideband CQI represents some type of average of the CQIs across all the M sub-bands (the average may be an arithmetic or geometric mean, or it could be an exponential or logarithmic average). Large-delay CDD (layer permutation) can be applied. In this case, the CQI for the second codeword is always equal to or larger than the reference CQI depending on the MIMO receiver (e.g., LMMSE/ML or SIC). In this case, the non-negative set of equation (1) is more appropriate.

Figure 3B:
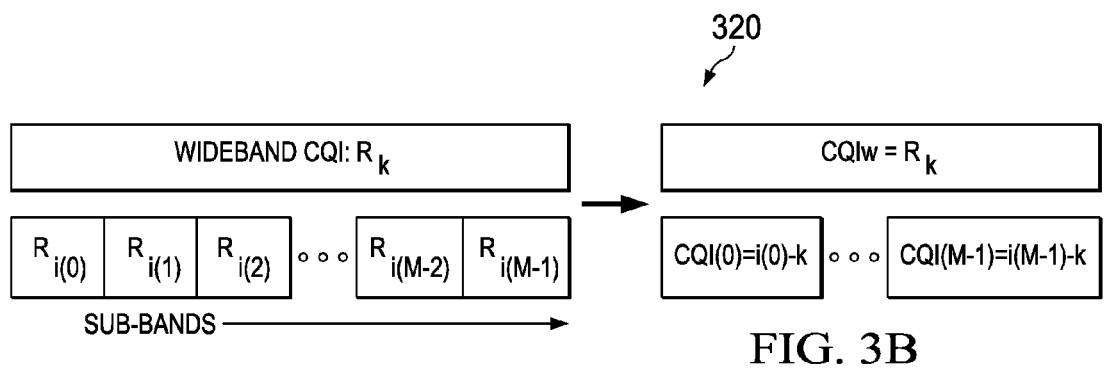

Another example is an all sub-band CQI compression where the CQI across all the M sub-bands (semi-statically configured by the Node B) are reported. Assuming a single transmission stream scenario, the CQIs associated with the M sub-bands are reported relative to a reference CQI value. An example of the reference CQI value is the wideband CQI defined in the previous discussion. An alternative example is the CQI corresponding to the median CQI across all sub-bands. This is illustrated in FIG. 3b. In this case, the differential CQI can be positive, zero, or negative. Therefore, the set of differential CQIs may be chosen as given in equation (3).

Figure 3C:
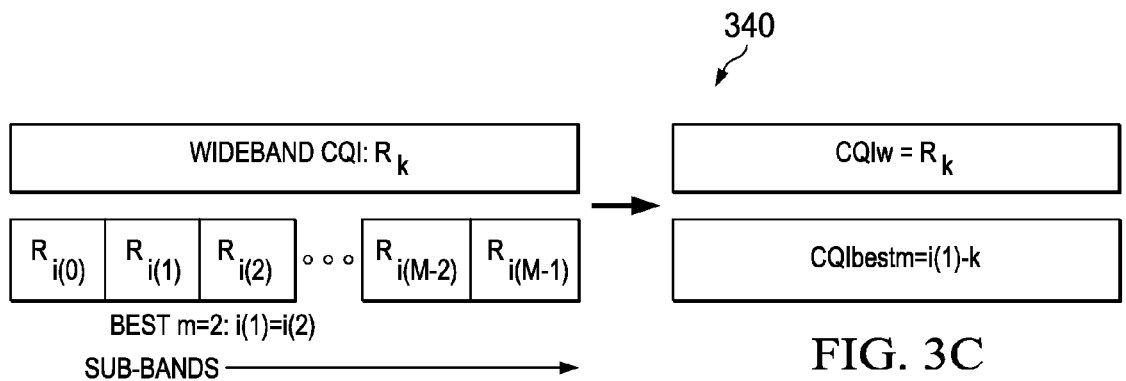

Yet another example is a selected sub-band CQI compression (assuming a single stream transmission), which reports a single (average) CQI value corresponding to the best m sub-bands (where m is chosen to be a small number compared to M). This CQI value is reported relative to a reference CQI value such as the wideband CQI defined above. This is illustrated in FIG. 3C. In this case, the best-m (averaged) CQI is always greater or equal to the reference (wideband) CQI. Therefore, a non-negative set as given in equation (1) may be employed.

However, if the best-m CQI cannot be guaranteed to be greater than or equal to the wideband CQI (e.g., if m is too large), the two-sided differential set given in equation (3) may be used, which is similar to the wideband CQI. In this case, however, an asymmetric two-sided set is more appropriate since the best-m CQI tends to be larger than the reference (wideband) CQI except for some scenarios (e.g., a flat fading channel where the wideband CQI is defined over a larger number of resource blocks and therefore is larger than the best-m CQI due to a larger Turbo coding gain for a larger codeblock size) as previously discussed. This may also be extended to the case where m CQI values corresponding to the best m sub-bands are defined relative to the wideband CQI.

Figure 3D:
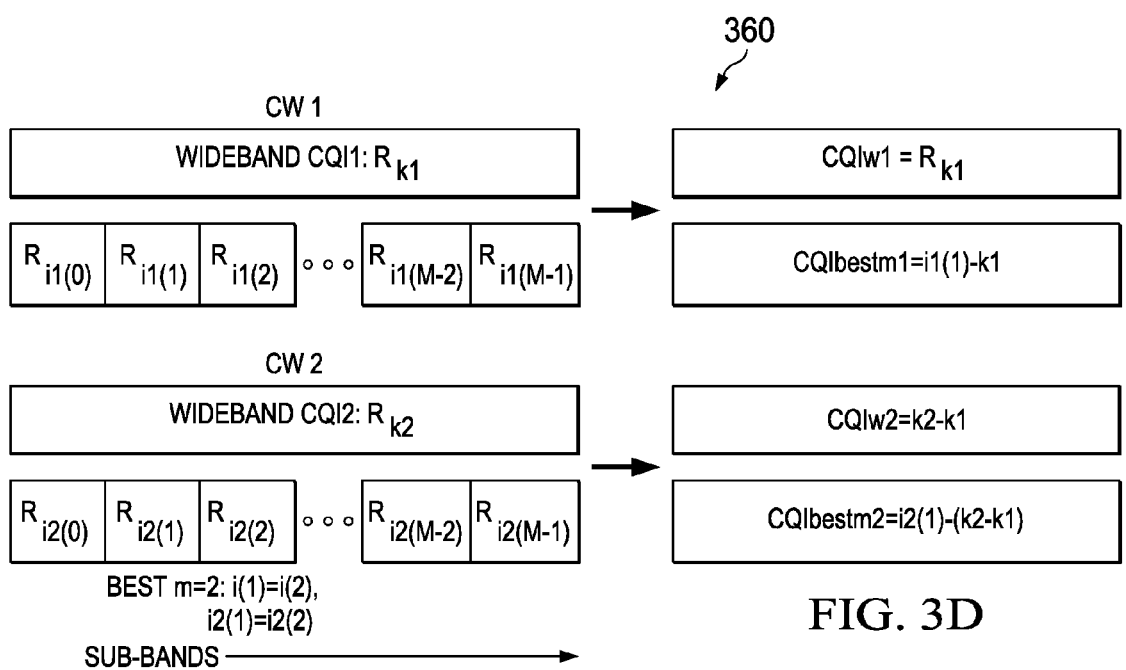

The spatial differential CQI may also be combined with the all sub-band or the selected sub-band report. In this case, the differential can be first taken across sub-bands, and then across spatial codewords. That is, the differential CQIs are first defined across sub-bands for the first spatial codeword. Then, for each of the corresponding sub-bands (e.g., all the M sub-bands or the best-m sub-band), the spatial differential CQI can be defined. In this case, the spatial differential CQI is defined for both the reference CQI and the other CQIs (M sub-bands or best-m CQI). Alternatively, it is possible to apply a spatial differential CQI only for the reference CQI (i.e., not for the other CQIs) as sufficient compression may already be obtained. FIG. 3D illustrates an example where the differential CQI is applied for both spatial and across sub-bands with the selected sub-band report (best-m).

In the following embodiments, sub-band selection is performed jointly for all codewords. Since the same set of sub-bands is selected for all the codewords, a UE only needs to send a single indication of the position of the selected sub-bands. Sub-band selection may be based on a performance metric defined over all codewords. For example, the performance metric may be defined as maximizing the sum throughput, summed over all codewords, maximizing the arithmetic or exponential average CQI over all codewords, maximizing the mean CQI over all codewords or minimizing the difference between CQIs of different codewords.

Figure 4A:
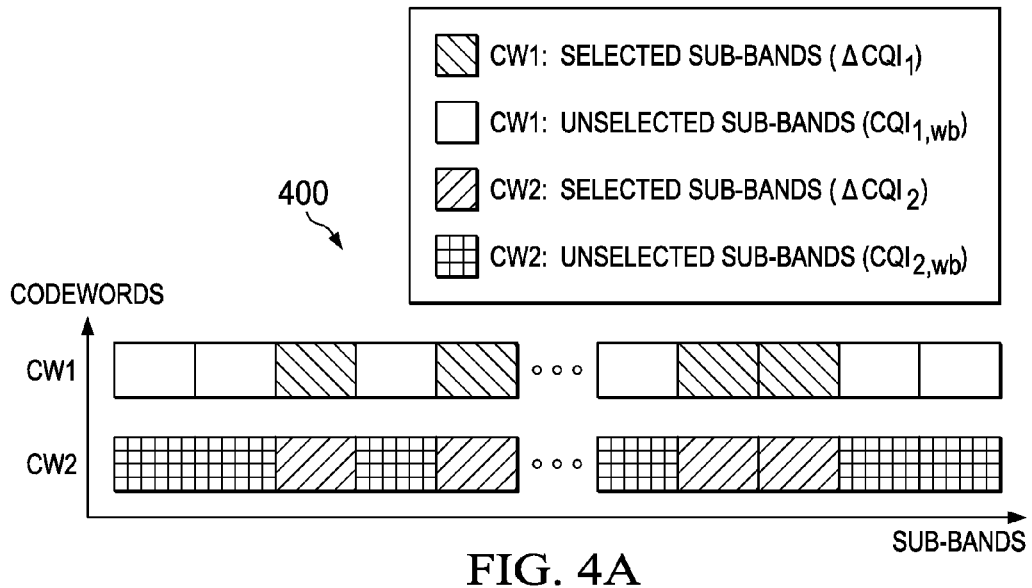
FIGS. 4A and 4B illustrate embodiments of best-M CQI formats constructed according to the principles of the present disclosure.
Figure 4B:
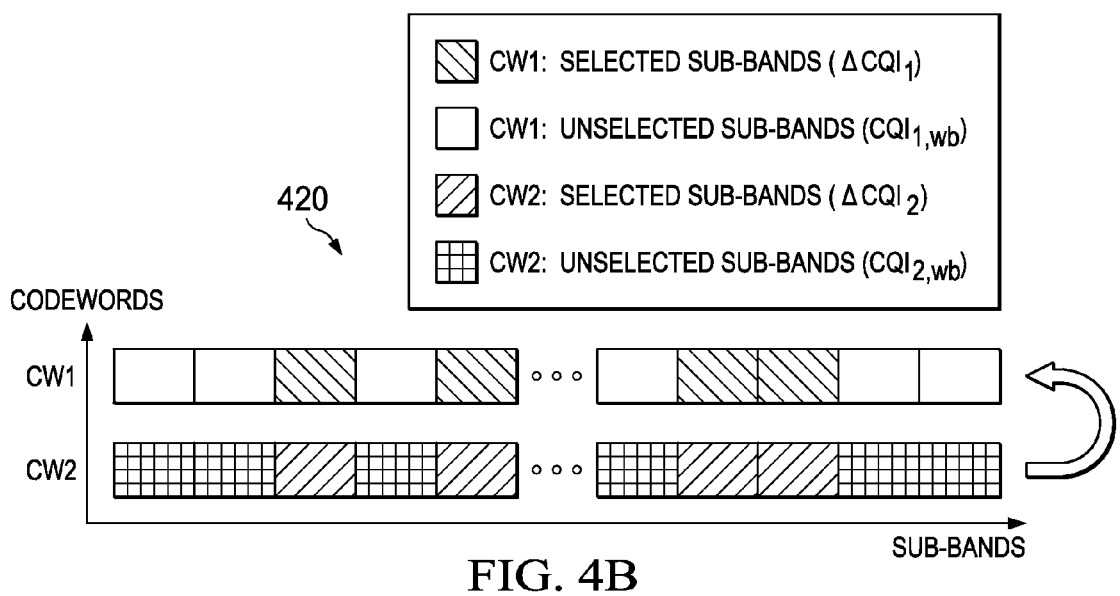

FIGS. 4A and 4B illustrate embodiments of best-m CQI formats constructed according to the principles of the present disclosure. FIG. 4A shows an embodiment of a best-m average CQI report. For the $r^{th}$ codeword ($r = 1, 2, \ldots, R$), two CQI values are computed. $CQI_{r,wb}$ corresponds to the wideband CQI of codeword r and is reported to the Node B with high resolution. $CQI_{r,best-m}$ is computed assuming transmitting only over the m selected sub-bands. $CQI_{r,best-m}$ may be computed using any type of average (such as the arithmetic average, the exponential average, the mean or the maximum/minimum) of the CQIs of the m selected sub-bands of the $r^{th}$ codeword. In terms of feeding back $CQI_{r,best-m}$, its difference relative to the wideband CQI where $(\Delta CQI_r = f_{diff}(CQI_{r,best-m}, CQI_{r,wb}))$ is reported. Note that the definition of differential CQI may be the same or different for different differential quantities. Equation set (4) summarizes these relationships.

$$\Delta CQI_1 = f_{diff}(CQI_{1,best-m}, CQI_{1,wb}), \quad (4a)$$

$$CQI_{1,wb}, \quad (4b)$$

$$\Delta CQI_2 = f_{\text{diff}}(CQI_{2,\text{best-}m}, CQI_{2,wb}) \text{ and} \quad (4c)$$

$$CQI_{2,wb}. \quad (4d)$$

FIG. 4B shows a variation of the best-m average scheme, which performs spatial CQI quantization on the wideband CQI of each codeword. The wideband CQI of codeword2 $CQI_2$, may be encoded differentially with respect to the wideband CQI of codeword1 ($CQI_{1,wb}$), thereby further reducing feedback overhead. Note that the definition of differential CQI may be the same or different for differing differential quantities. The arrow in FIG. 4B indicates that differential quantization is employed with respect to codeword1 (CW1) for the wideband CQIs. Equation set (5) summarizes these relationships.

$$\Delta CQI_1 f_{\text{diff}}(CQI_{1,\text{best-}m}, CQI_{1,wb}) \quad (5a)$$

$$CQI_{1,wb}, \quad (5b)$$

$$\Delta CQI_2 = f_{\text{diff}}(CQI_{2,\text{best-}m}, CQI_{2,wb}), \text{ and} \quad (5c)$$

$$\Delta CQI_{2,wb} = f_{\text{diff}}(CQI_{2,wb}, CQI_{1,wb}). \quad (5d)$$

A set of differential CQI values may be defined for differential reporting of the best-m average CQI for each codeword. Because the m sub-bands are jointly selected across multiple codewords, they may not be equivalent to the m sub-bands that have the best CQI for each particular codeword.

In single antenna and TxD systems, the best-m average CQI is always equal to or larger than the wideband CQI. However, this is not valid in MIMO-SM systems. For example, consider a two codeword system whose CQI is expressed as codeword1 2 4 4 2, and (6)

codeword2 2 1 1 2. (7)

The average CQIs across the two codewords are 2 2.5 2.5 2, so sub-band 2 and 3 will be selected. For the codeword1, the best-m average CQI of ($CQI_{1,\text{best-}m}=4$) is greater that the wideband CQI of ($CQI_{1,\text{wideband}}=3$). However, for the codeword2, the best-m average CQI of ($CQI_{2,\text{best-}M}=1$) is smaller than the wideband CQI of ($CQI_{2,\text{wideband}}=1.5$).

For best-m quantization of MIMO-SM systems, the set of differential CQI includes both negative and positive entries. Define the set of differential CQI as $s=\{s_1, s_2, \ldots, s_{2^L}\}$, where $s_1 < s_2 < \ldots < s_{2^L}$. A possible design of the differential CQI set includes but is not limited to $$S=\{s_1, s_2, \ldots, s_{2^L}\}=\{-2^{L/2}1, -2^{L/2}+2, \ldots 2^{L/2}\}, \quad (8)$$

$$S=\{s_1, s_2, \ldots, s_{2^L}\}=\{-2^{L/2}, -2^{L/2}+1, \ldots 2^{L/2}-1\}, \text{ and} \quad (9)$$

$$S=\{s_1, s_2, \ldots, s_2^{L/2}\}=\{-2^{L/2}+x, -2^{L/2}+1+x, \ldots 2^{L/2}-1+x\}. \quad (10)$$

In equation (10), the value of x can be chosen to prioritize the representation of a negative differential CQI or a positive differential CQI.

Figure 5:
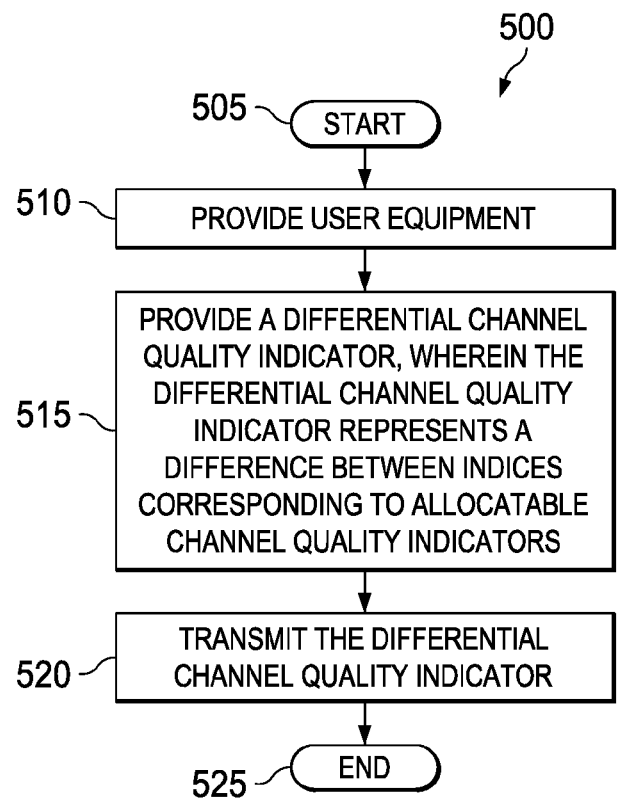
FIG. 5 illustrates a flow diagram of an embodiment of a method of operating a feedback generator carried out according to the principles of the present disclosure.

FIG. 5 illustrates a flow diagram of an embodiment of a method of operating a feedback generator 500 carried out according to the principles of the present disclosure. The method 500 may be employed in an OFDMA system and starts in a step 505. Then, user equipment is provided in the OFDMA system, a step 510. A differential channel quality indicator is provided, wherein the differential channel quality indicator represents a difference between indices corresponding to allocatable channel quality indicators, in a step 515.

In one embodiment, the differential channel quality indicator represents a difference between indices that denote a set of supportable pairs of modulation and coding rate. Additionally, the differential channel quality indicator is positive, negative or zero. Alternatively, the differential channel quality indicator is provided as an approximation to a difference between indices for non-allocatable channel quality indicators.

In one embodiment, the differential channel quality indicator of at least one frequency sub-band is defined with respect to a channel quality indicator selected for a portion of all frequency sub-bands. In one embodiment, the differential channel quality indicator of at least one spatial codeword is defined with respect to a channel quality indicator for another spatial codeword. In one embodiment, the differential channel quality indicator is defined for a combination of multiple frequency sub-bands and multiple spatial codewords. The differential channel quality indicator is transmitted in a step 520, and the method ends in a step 525.

Figure 6:
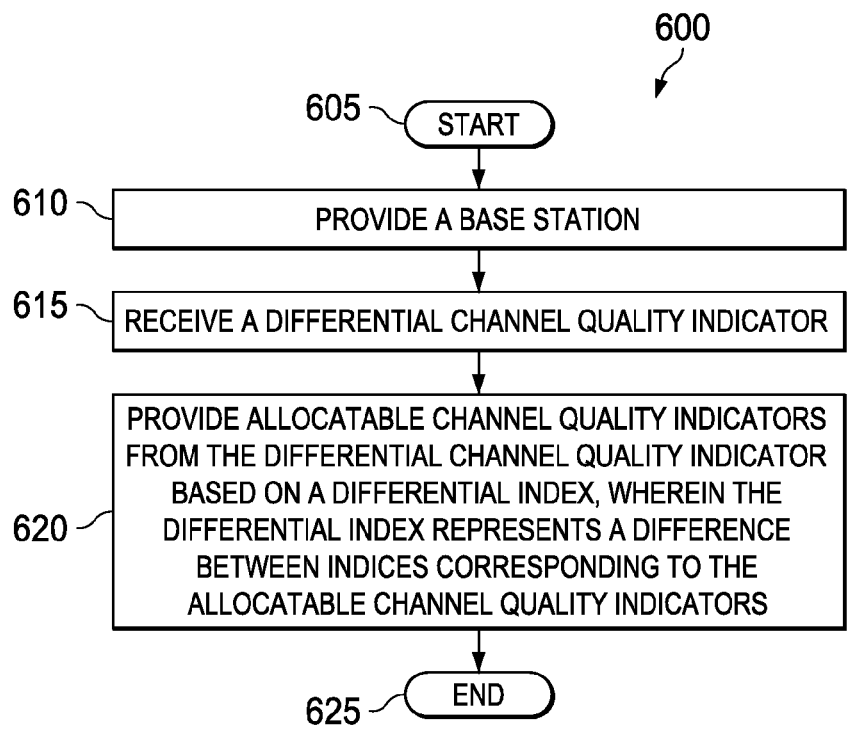
FIG. 6 illustrates a flow diagram of an embodiment of a method of operating a feedback decoder carried out according to the principles of the present disclosure.

FIG. 6 illustrates a flow diagram of an embodiment of a method of operating a feedback decoder 600 carried out according to the principles of the present disclosure. The method 600 may be employed in an OFDMA system and starts in a step 605. Then, a base station is provided in the ODFMA system, in a step 610. A differential channel quality indicator is received, in a step 615. Allocatable channel quality indicators are provided from the differential channel quality indicator based on a differential index, wherein the differential index represents a difference between indices corresponding to the allocatable channel quality indicators, in a step 620.

In one embodiment, the differential channel quality indicator represents a difference between indices that denote a set of supportable pairs of modulation and coding rate. Additionally, the differential channel quality indicator is positive, negative or zero. Alternatively, the differential channel quality indicator is provided as an approximation to a difference between indices for non-allocatable channel quality indicators.

In one embodiment, the differential channel quality indicator of at least one frequency sub-band is defined with respect to a channel quality indicator selected for a portion of all frequency sub-bands. In one embodiment, the differential channel quality indicator of at least one spatial codeword is defined with respect to a channel quality indicator for another spatial codeword. In one embodiment, the differential channel quality indicator is defined for a combination of multiple frequency sub-bands and multiple spatial codewords. The method ends in a step 625.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described embodiments.

What is claimed is:

1. A feedback generator in user equipment, comprising:
 a CQI profile module configured to provide a differential channel quality indicator, wherein the differential channel quality indicator represents a difference between a first index and a second index, wherein the first index corresponds to a channel quality of an allocated sub-band of the user equipment and the second index corresponds to a wideband CQI, wherein the wideband CQI is an average CQI across all allocated sub-bands; and a transmit module that transmits the differential channel quality indicator.

2. The generator as recited in claim 1 wherein the differential channel quality indicator represents a difference between indices that denote a set of supportable pairs of modulation and coding rate.

3. The generator as recited in claim 1 wherein the differential channel quality indicator is provided as an approximation to a difference between indices for non-allocatable channel quality indicators.

4. The generator as recited in claim 1 wherein the differential channel quality indicator of at least one frequency sub-band is defined with respect to a channel quality indicator selected for a portion of all frequency sub-bands.

5. The generator as recited in claim 1 wherein the differential channel quality indicator of at least one spatial codeword is defined with respect to a channel quality indicator for another spatial codeword.

6. The generator as recited in claim 1 wherein the differential channel quality indicator is defined for a combination of multiple frequency sub-bands and multiple spatial codewords.

7. The generator as recited in claim 1 wherein the differential channel quality indicator is positive, negative or zero.

8. A method of operating a feedback generator in user equipment, comprising:

providing a differential channel quality indicator, wherein the differential channel quality indicator represents a difference between a first index and a second index, wherein the first index corresponds to a channel quality of an allocated sub-band of the user equipment and the second index corresponds to a wideband CQI, wherein the wideband CQI is a median CQI across all allocated sub-bands; and transmitting the differential channel quality indicator.

9. The method as recited in claim 8 wherein the differential channel quality indicator represents a difference between indices that denote a set of supportable pairs of modulation and coding rate.

10. The method as recited in claim 8 wherein the differential channel quality indicator is provided as an approximation to a difference between indices for non-allocatable channel quality indicators.

11. The method as recited in claim 8 wherein the differential channel quality indicator of at least one frequency sub-band is defined with respect to a channel quality indicator selected for a portion of all frequency sub-bands.

12. The method as recited in claim 8 wherein the differential channel quality indicator of at least one spatial codeword is defined with respect to a channel quality indicator for another spatial codeword.

13. The method as recited in claim 8 wherein the differential channel quality indicator is defined for a combination of multiple frequency sub-bands and multiple spatial codewords.

14. The method as recited in claim 8 wherein the differential channel quality indicator is positive, negative or zero.

15. A feedback decoder in a base station, comprising:

a receive module configured to receive a differential channel quality indicator; and a CQI selection module configured to provide channel quality indicators from the differential channel quality indicator based on a differential index, wherein the differential index represents a difference between a first index and a second index, wherein the first index corresponds to a channel quality of an allocated sub-band of the user equipment and the second index corresponds to a wideband CQI, wherein the wideband CQI is a median CQI across all allocated sub-bands.

16. The decoder as recited in claim 15 wherein the differential channel quality indicator represents a difference between indices that denote a set of supportable pairs of modulation and coding rate.

17. The decoder as recited in claim 15 wherein the differential channel quality indicator is provided as an approximation to a difference between indices for non-allocatable channel quality indicators.

18. The decoder as recited in claim 15 wherein the differential channel quality indicator of at least one frequency sub-band is defined with respect to a channel quality indicator selected for a portion of all frequency sub-bands.

19. The decoder as recited in claim 15 wherein the differential channel quality indicator of at least one spatial codeword is defined with respect to a channel quality indicator for another spatial codeword.

20. The decoder as recited in claim 15 wherein the differential channel quality indicator is defined for a combination of multiple frequency sub-bands and multiple spatial codewords.

21. The decoder as recited in claim 15 wherein the differential channel quality indicator is positive, negative or zero.

22. A method of operating a feedback decoder in a base station, comprising:

receiving a differential channel quality indicator; and providing channel quality indicators from the differential channel quality indicator based on a differential index, wherein the differential index represents a difference between a first index and a second index, wherein the first index corresponds to a channel quality of an allocated sub-band of the user equipment and the second index corresponds to a wideband CQI, wherein the wideband CQI is a median CQI across all allocated sub-bands.

23. The method as recited in claim 22 wherein the differential channel quality indicator represents a difference between indices that denote a set of supportable pairs of modulation and coding rate.

24. The method as recited in claim 22 wherein the differential channel quality indicator is provided as an approximation to a difference between indices for non-allocatable channel quality indicators.

25. The method as recited in claim 22 wherein the differential channel quality indicator of at least one frequency sub-band is defined with respect to a channel quality indicator selected for a portion of all frequency sub-bands.

26. The method as recited in claim 22 wherein the differential channel quality indicator of at least one spatial codeword is defined with respect to a channel quality indicator for another spatial codeword.

27. The method as recited in claim 22 wherein the differential channel quality indicator is defined for a combination of multiple frequency sub-bands and multiple spatial codewords.

28. The method as recited in claim 22 wherein the differential channel quality indicator is positive, negative or zero.

* * * * *